(12) United States Patent
Matsubara

(10) Patent No.: US 7,623,045 B2
(45) Date of Patent: Nov. 24, 2009

(54) FACILITY DISPLAY UNIT

(75) Inventor: Tsutomu Matsubara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 161 days.

(21) Appl. No.: 10/589,345

(22) PCT Filed: Apr. 21, 2004

(86) PCT No.: PCT/JP2004/005726

§ 371 (c)(1),
(2), (4) Date: Aug. 11, 2006

(87) PCT Pub. No.: WO2005/104063

PCT Pub. Date: Nov. 3, 2005

(65) Prior Publication Data

US 2007/0176795 A1 Aug. 2, 2007

(51) Int. Cl.
*G08G 1/123* (2006.01)
(52) U.S. Cl. .................. 340/995.1; 340/990; 701/202; 701/208; 701/211; 701/212; 701/204
(58) Field of Classification Search ............. 340/995.1, 340/990; 701/208, 202, 211, 212, 204
See application file for complete search history.

(56) References Cited

U.S. PATENT DOCUMENTS

| | | | | |
|---|---|---|---|---|
| 5,861,885 A | * | 1/1999 | Strasnick et al. ............ | 715/850 |
| 6,336,073 B1 | * | 1/2002 | Ihara et al. .................. | 701/202 |
| 6,611,753 B1 | * | 8/2003 | Millington .................. | 701/209 |
| 6,977,630 B1 | * | 12/2005 | Donath et al. ................ | 345/7 |
| 7,069,232 B1 | * | 6/2006 | Fox et al. ..................... | 705/10 |
| 2002/0150304 A1 | * | 10/2002 | Ockman ...................... | 382/260 |
| 2003/0163251 A1 | * | 8/2003 | Obradovich et al. ......... | 701/208 |
| 2004/0172191 A1 | * | 9/2004 | Vitikainen et al. ........... | 701/208 |
| 2004/0204849 A1 | * | 10/2004 | Shipley et al. .............. | 701/212 |
| 2004/0213459 A1 | * | 10/2004 | Ishimaru et al. ............. | 382/191 |
| 2004/0236507 A1 | * | 11/2004 | Maruyama et al. .......... | 701/208 |
| 2005/0177304 A1 | * | 8/2005 | Tu ............................... | 701/211 |
| 2006/0136125 A1 | * | 6/2006 | Chua ........................... | 701/208 |

FOREIGN PATENT DOCUMENTS

| | | |
|---|---|---|
| CN | 1391388 A | 1/2003 |
| JP | 6-60298 A | 3/1994 |
| JP | 9-171348 A | 6/1997 |
| JP | 10-115529 A | 5/1998 |
| JP | 2001-50757 A | 2/2001 |
| JP | 2001-50764 A | 2/2001 |
| JP | 2001-338037 A | 12/2001 |
| JP | 2002-140731 A | 5/2002 |
| JP | 2002-341753 A | 11/2002 |

* cited by examiner

*Primary Examiner*—Benjamin C Lee
*Assistant Examiner*—Ojiako Nwugo
(74) *Attorney, Agent, or Firm*—Birch, Stewart, Kolasch & Birch, LLP

(57) ABSTRACT

A facility display unit three-dimensionally displays an image of the facilities identified by a facility identifying section 6 on a wide-area map according to a display mode set by a setting accepting section 1, and zooms in on the image of the facilities. The facility display unit also rotates the image of the facilities simultaneously with the zoom in or after completing the zoom in. This enables a user to roughly check the position of the facilities, and then to grasp an overall image of the facilities.

40 Claims, 15 Drawing Sheets

TABLE OF FACILITIES

| RAINBOW BRIDGE |
| BIG SIGHT |
| AQUA CITY |
| ⋮ |

VEHICLE

FACILITY DISPLAY UNIT

TECHNICAL FIELD

The present invention relates to a facility display unit for displaying facilities of a destination, for example, (facilities are assumed here to include not only artificial objects such as buildings, but also natural objects such as trees and wilderness parks).

BACKGROUND ART

A conventional facility display unit includes a voice recognition means for recognizing speech of a user, and when the user utters the name of facilities, the voice recognition means identifies the facilities.

Then, the facility display unit reads three-dimensional data on the facilities from a database, and displays still pictures of the facilities according to the three-dimensional data (see Relevant Reference 1, for example).

Relevant Reference 1: Japanese patent application laid-open No. 9-171348/1997 (paragraphs [0042]-[0058] and FIG. 1)

With the foregoing configuration, the conventional facility display unit can identify the facilities to be displayed, and three-dimensionally display the still pictures of the facilities. However, it is impossible for the user to freely set the display mode of the facilities, or to display moving pictures of the facilities. Thus, the conventional facility display unit has a problem of hindering the user from grasping an overall picture of the facilities with ease.

The present invention is implemented to solve the foregoing problem. Therefore it is an object of the present invention to provide a facility display unit capable of enabling a user to grasp the overall picture of the facilities easily.

DISCLOSURE OF THE INVENTION

The facility display unit according to the present invention is configured in such a manner that it displays a moving picture or still picture of the facilities identified by a facility identifying means on a map in accordance with a display mode set by a setting means.

Thus, it offers an advantage of enabling a user to grasp an overall image of the facilities with ease.

BRIEF DESCRIPTION OF THE DRAWINGS

FIG. 4 is a diagram illustrating an image of the facilities during a zoom in;

FIG. 5 is a diagram illustrating another image of the facilities during the zoom in;

FIG. 6 is a diagram illustrating an image of the facilities after completing the zoom in;

BEST MODE FOR CARRYING OUT THE INVENTION

The best mode for carrying out the invention will now be described with reference to the accompanying drawings to explain the present invention in more detail.

Embodiment 1

Figure 1:
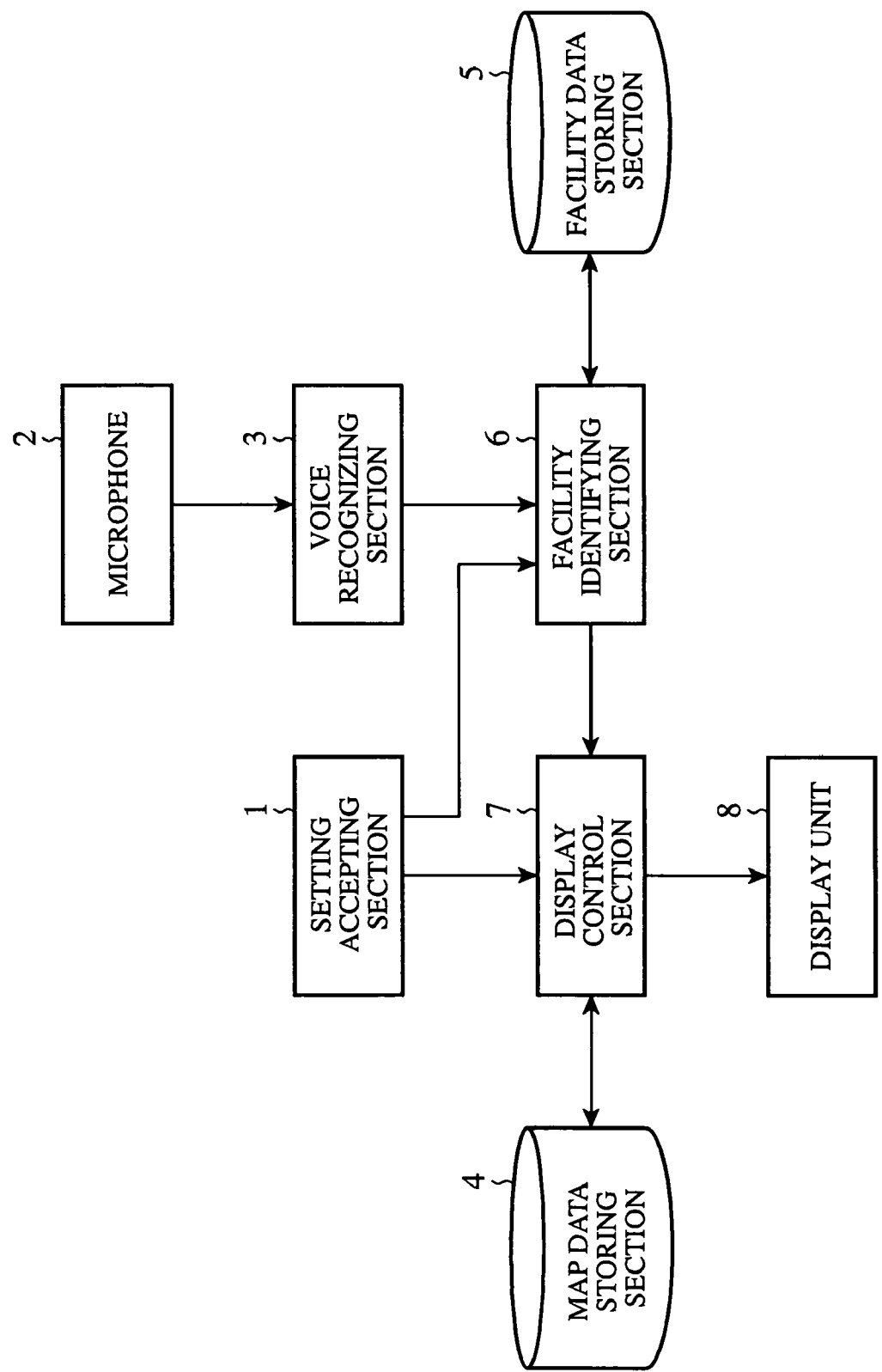
FIG. 1 is a block diagram showing a configuration of a facility display unit of an embodiment 1 in accordance with the present invention.

FIG. 1 is a block diagram showing a configuration of the facility display unit of an embodiment 1 in accordance with the present invention. In FIG. 1, a setting accepting section 1 is composed of an external interface for receiving an operation signal such as infrared rays transmitted from a remote control, or a man-machine interface such as key switches for accepting the operation of a user. The user utilizes the setting accepting section 1 for carrying out a variety of settings such as setting a destination and the display mode of the facilities.

The setting accepting section constitutes a setting means.

A microphone 2 receives the speech of the user. A voice recognizing section 3 carries out recognition processing of the speech of the user input to the microphone 2.

A map data storing section 4 is a memory that stores map data for three-dimensional display and map data for two-dimensional display. A facility data storing section 5 is a memory that stores image data (such as polygon data) and position data on various facilities in correspondence with text data, and stores a default display mode.

A facility identifying section 6 retrieves image data and position data on the facilities corresponding to the text data which is a recognition result of the voice recognizing section 3 from the image data and position data on the facilities stored in the facility data storing section 5.

Here, the microphone 2, voice recognizing section 3, facility data storing section 5 and facility identifying section 6 constitute a facility identifying means.

A display control section 7 controls a display unit 8 such as a liquid crystal display to display on a map a moving picture or still picture of the facilities identified by the facility identifying section 6 according to the display mode set by the setting accepting section 1.

Here, the display control section 7 and display unit 8 constitute a display means.

Figure 2:
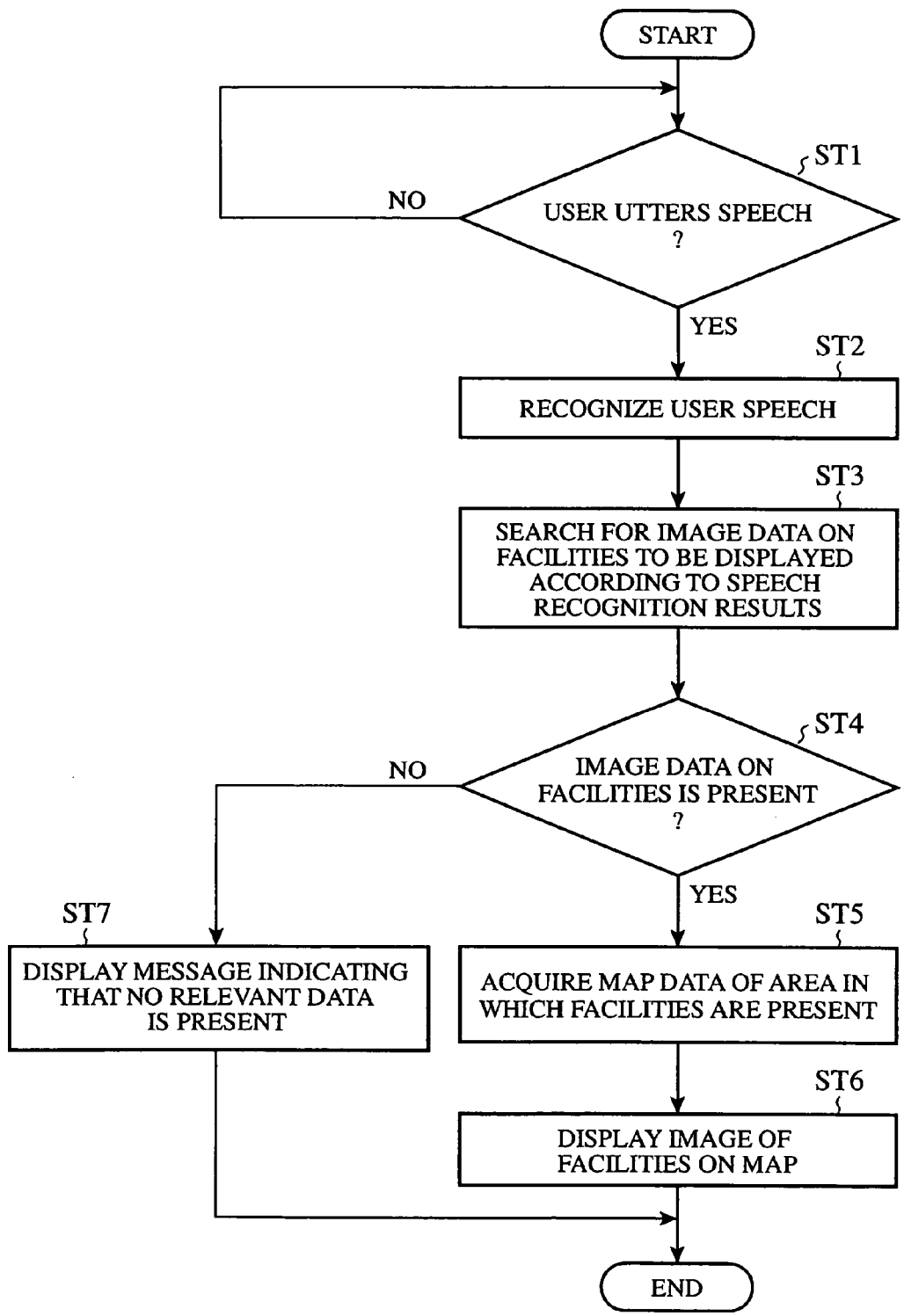
FIG. 2 is a flowchart illustrating processing of the facility display unit of the embodiment 1 in accordance with the present invention.

FIG. 2 is a flowchart illustrating processing of the facility display unit of the embodiment 1 in accordance with the present invention.

Next, the operation will be described.

It is possible for the facility display unit of FIG. 1 to divide the display area of the display unit 8 into two parts, and to display a three-dimensional map on a first display area and to display a two-dimensional map on a second display area. Thus, the user can freely set the display mode of the facilities which are displayed on the three-dimensional map or two-dimensional map (the facilities are assumed to include not only artificial objects such as buildings, but also natural objects such as trees and wilderness park).

Figures 7, 8:
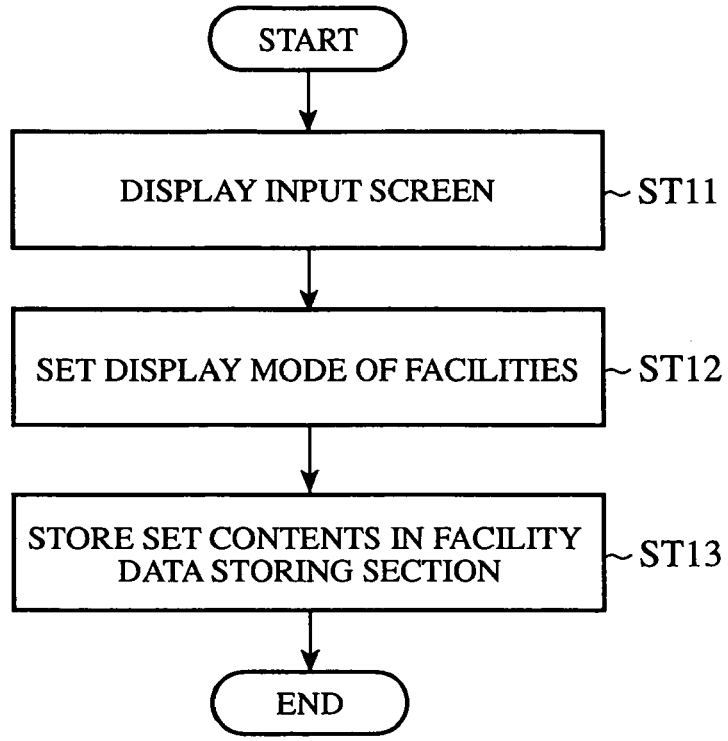
FIG. 7 is a flowchart illustrating setting processing of a display mode of the facilities.
FIG. 8 is a table of the facilities.

More specifically, as shown in FIG. 7, the user operates the setting accepting section 1 to cause the display unit 8 to display an input screen for setting the display mode of the facilities (step ST11).

When the user sets the display mode of the facilities on the input screen by operating the setting accepting section 1 (step ST12), the setting accepting section 1 stores the setting contents into the facility data storing section 5 (step ST13).

As for the settings of the display mode of the facilities, there are such setting as to whether to display the image of the facilities in a moving picture or still picture, setting of a moving picture pattern when the image of the facilities is to be displayed in the moving picture, and setting of the scaling ratio of the facilities when the image of the facilities is to be displayed in the still picture.

For convenience of explanation, it is assumed here that the settings are made for displaying the image of the facilities in the moving picture, for making three-dimensional display of the image of the facilities on a wide-area map as a moving picture pattern, and for zooming in on the image of the facilities and rotating the image of the facilities after completing the zoom in. As for the zoom in technique of the image of the facilities, it does not matter in particular. However, the zoom in can be carried out by making interpolation or thinning out of the data utilizing the computer graphics technique.

Once the display mode of the facilities has been set, an image of sample facilities is displayed on the display unit 8 in accordance with the display mode so that the user can confirm the display mode. When the user admits the display mode, the display mode is stored in the facility data storing section 5.

Once the user has set the display mode of the facilities by operating the setting accepting section 1, display of the facilities becomes possible. Thus, when the user utters the name of the facilities to the microphone 2 (step ST1), the microphone 2 receives the speech of the user, and the voice recognizing section 3 carries out the recognition processing of the input speech of the user supplied from the microphone 2 (step ST2).

For example, when the user utters "Rainbow Bridge" as the name of the facilities, the voice recognizing section 3 recognizes the speech of the user, and supplies the facility identifying section 6 with the text data indicating "Rainbow Bridge".

Receiving the text data indicating the recognition result of the speech from the voice recognizing section 3, the facility identifying section 6, using the text data as the key, retrieves the image data and position data on the facilities to be displayed from the image data and position data on the facilities stored in the facility data storing section 5 (step ST3).

Thus, the embodiment retrieves the image data and position data on "Rainbow Bridge".

When the facility identifying section 6 can retrieve the image data and position data on the facilities to be displayed (step ST4), the display control section 7 acquires for the three-dimensional display the map data of the region in which the facilities are present from the map data storing section 4 with reference to the position data (step ST5).

The map data acquired from the map data storing section 4 is such wide-area map data that enables the user to confirm only the presence of the facilities (such as 1:10,000 map data). However, the user can set the scaling ratio of the map data as he or she chooses by operating the setting accepting section 1.

Acquiring the map data from the map data storing section 4, the display control section 7 displays the image of the facilities identified by the facility identifying section 6 on the map according to the display mode set by the setting accepting section 1 (step ST6).

Figure 3:
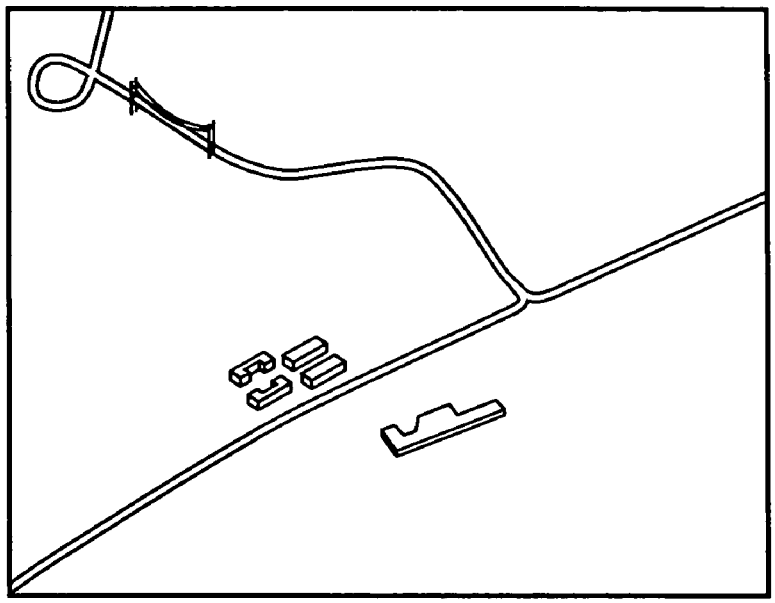
FIG. 3 is a diagram illustrating an image of facilities displayed on a wide-area map.

More specifically, as shown in FIG. 3, the display control section 7 displays the wide-area map on the display unit 8 according to the map data acquired from the map data storing section 4, and three-dimensionally displays the image of the facilities on the wide-area map according to the image data on the facilities retrieved by the facility identifying section 6.

Figure 4:
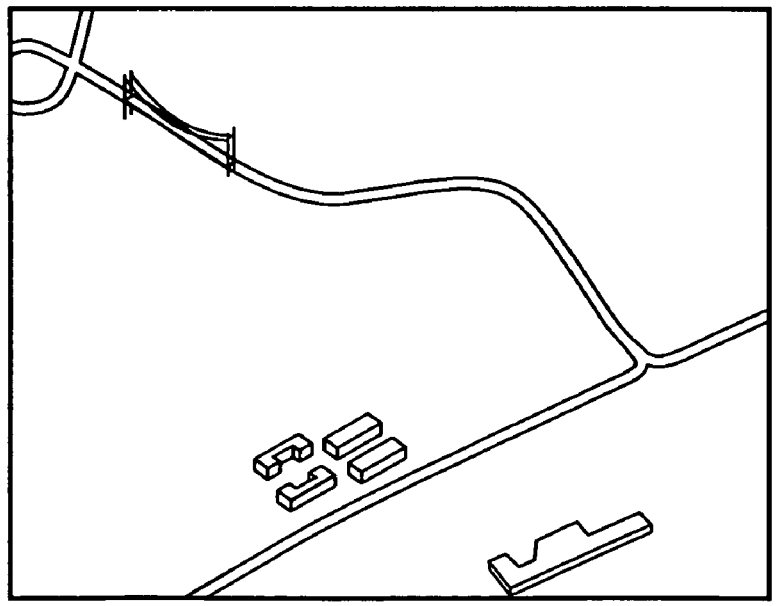
Figure 5:
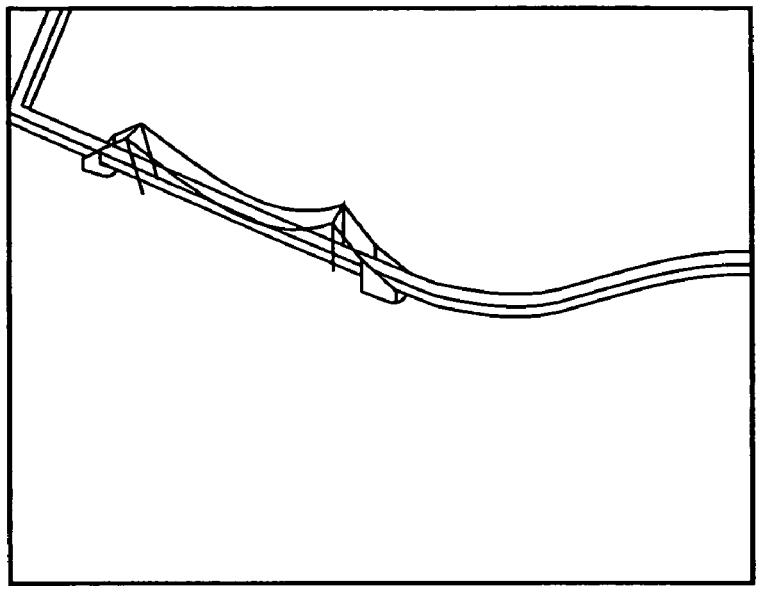
Figure 6:
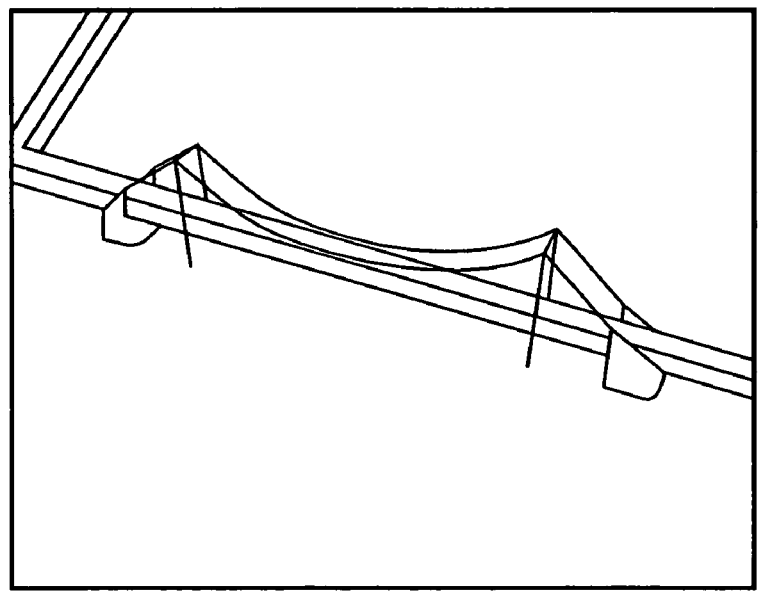

After that, the display control section 7 gradually zooms in on the image of the facilities at a predetermined increment unit (see in the order of FIG. 4→FIG. 5→FIG. 6), and zooms in on the image of the facilities at a maximum with maintaining all the facilities within the display area of the display unit 8 (see FIG. 6).

After completing the zoom in of the image of the facilities, the display control section 7 rotates the image of the facilities in a horizontal plane so that the user can grasp the whole body of the facilities (rotates by the preset number of times). Thus, the image of the facilities is displayed from all the directions.

Here, although the embodiment is described by way of example that rotates the image of the facilities after completing the zoom in of the image of the facilities, this is not essential. For example, the image of the facilities can be rotated during the zoom in. In addition, the rotation of the images is not limited in a horizontal plane. The images can be rotated in a vertical plane, or in an oblique plane, or in a combined plane of them.

If the facility identifying section 6 cannot retrieve the image data or position data on the facilities to be displayed (step ST4), that is, if the image data or position data on the facilities corresponding to the speech of the user is not stored in the facility data storing section 5, the display control section 7 displays on the display unit 8 a message indicating that the image data or the like of the facilities corresponding to the speech of the user is not stored in the facility data storing section 5 (step ST7).

As is clear from the foregoing description, the present embodiment 1 is configured in such a manner that according to the display mode set by the setting accepting section 1, the moving picture or still picture of the facilities identified by the facility identifying section 6 is displayed on the map. Thus, the present embodiment 1 offers an advantage of enabling the user to grasp the overall picture of the facilities with ease.

In addition, the present embodiment 1 is configured in such a manner that it identifies the facilities to be displayed by recognizing the speech of the user. Thus, it offers an advantage of being able to display the images of the desired facilities without any troublesome operation of the user.

The present embodiment 1 is configured in such a manner that it zooms in on the image of the facilities after three-dimensionally displaying the image of the facilities identified by the facility identifying section 6 on the wide-area map. Thus it offers an advantage of enabling the user to grasp the overall picture of the facilities after roughly checking the position of the facilities.

Furthermore, the present embodiment 1 is configured in such a manner that it rotates the image of the facilities during or after the zoom in. Thus it offers an advantage of enabling the user to grasp the overall picture of the facilities.

Moreover, the present embodiment 1 is configured such that it zooms in on the image of the facilities in such a manner that it can maintain the whole body of the facilities within the display area of the display unit 8. Thus it can display the whole body of the facilities large enough without losing any part of the facilities.

Although the present embodiment 1 is described by way of example that identifies the facilities to be displayed by recognizing the speech of the user by the voice recognizing section 3, this is not essential. For example, the user can operate the setting accepting section 1 to identify the facilities to be displayed.

More specifically, the user can operate the setting accepting section 1 to display on the display unit 8 a table of facilities that can be displayed (see FIG. 8), and select the facilities to be displayed from the table.

In this case also, the present embodiment 1 offers an advantage of being able to display the images of the desired facilities without any troublesome operation of the user.

Although the present embodiment 1 is described by way of example that three-dimensionally displays the image of the facilities identified by the facility identifying section 6 on the map, the image of the facilities can be two-dimensionally displayed on the map.

When the image of the facilities is two-dimensionally displayed, the image of the facilities can be enlarged after displaying the image of the facilities on the wide-area map.

Although the present embodiment 1 is described by way of example in which the map data storing section 4 stores the map data, the map data storing section 4 can store only the map data of part of the region to save its memory capacity.

Accordingly, it is probable that the map data storing section 4 does not store the map data of the region including the facilities to be displayed. In such a case, the map data of that region is downloaded from an external server to be stored in the map data storing section 4.

Figure 9:
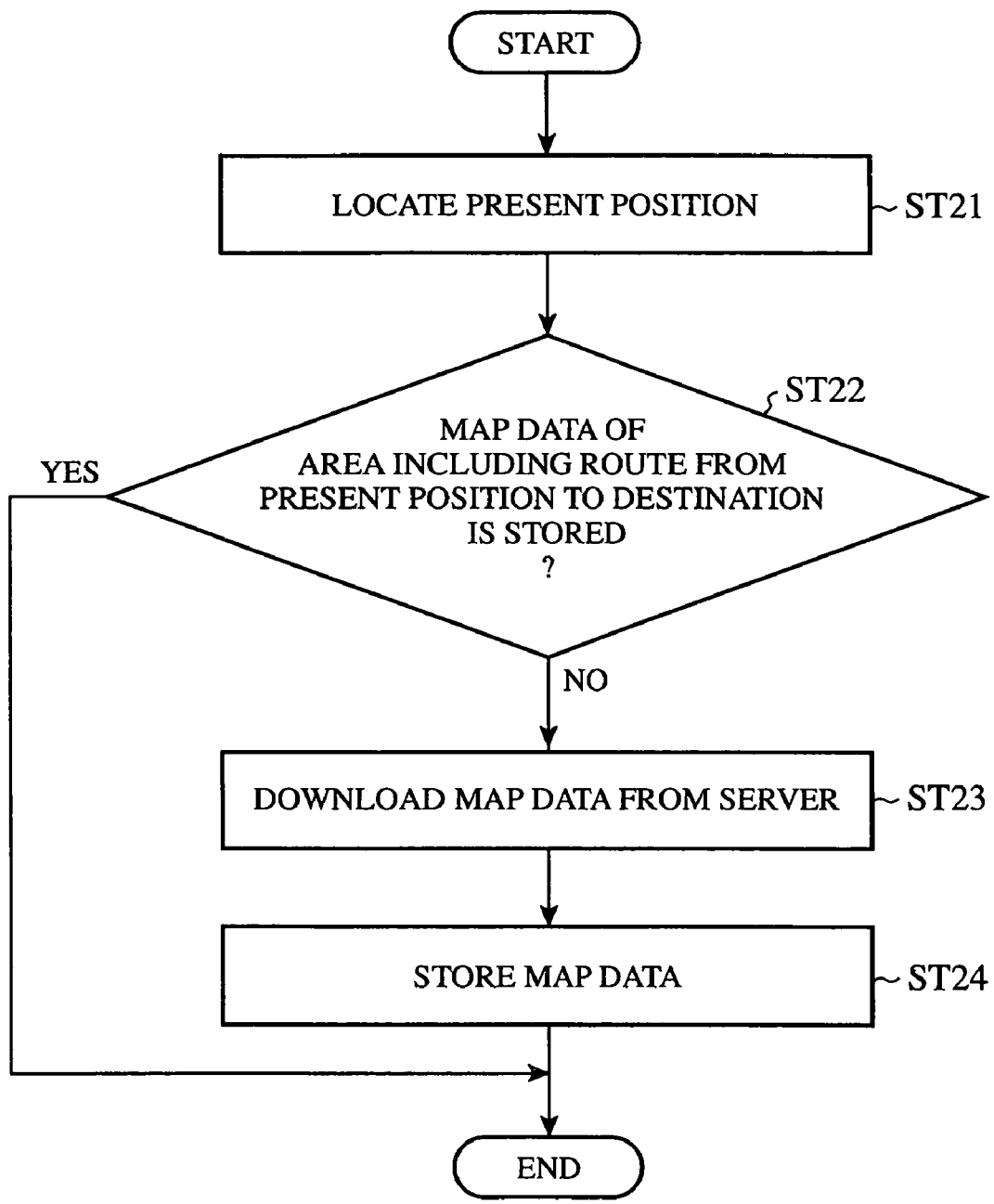
FIG. 9 is a flowchart illustrating downloading of map data.

More specifically, the display control section 7 locates the present position by receiving GPS data from GPS satellites as shown in FIG. 9, for example (step ST21), and makes a decision as to whether the map data storing section 4 stores the map data of the region including a route from the present position to the destination (with reference to the position data on the facilities to be displayed) (step ST22).

When the map data storing section 4 does not store the map data of that region, the display control section 7 downloads the map data of the region from the external server (step ST23), and stores the map data in the map data storing section 4 (step ST24).

Embodiment 2

The foregoing embodiment 1 is described by way of example in which the display control section 7 three-dimensionally displays the image of the facilities on the wide-area map according to the image data on the facilities retrieved by the facility identifying section 6, followed by gradually zooming in on the image of the facilities. After that, the display control section 7 can further zoom in on the image of the facilities, which have been zoomed in, in response to an enlarged display request of the facilities from the user. Alternatively, the display control section 7 can make enlarged display of specific objects in the facilities (such as commodities).

Figure 10:
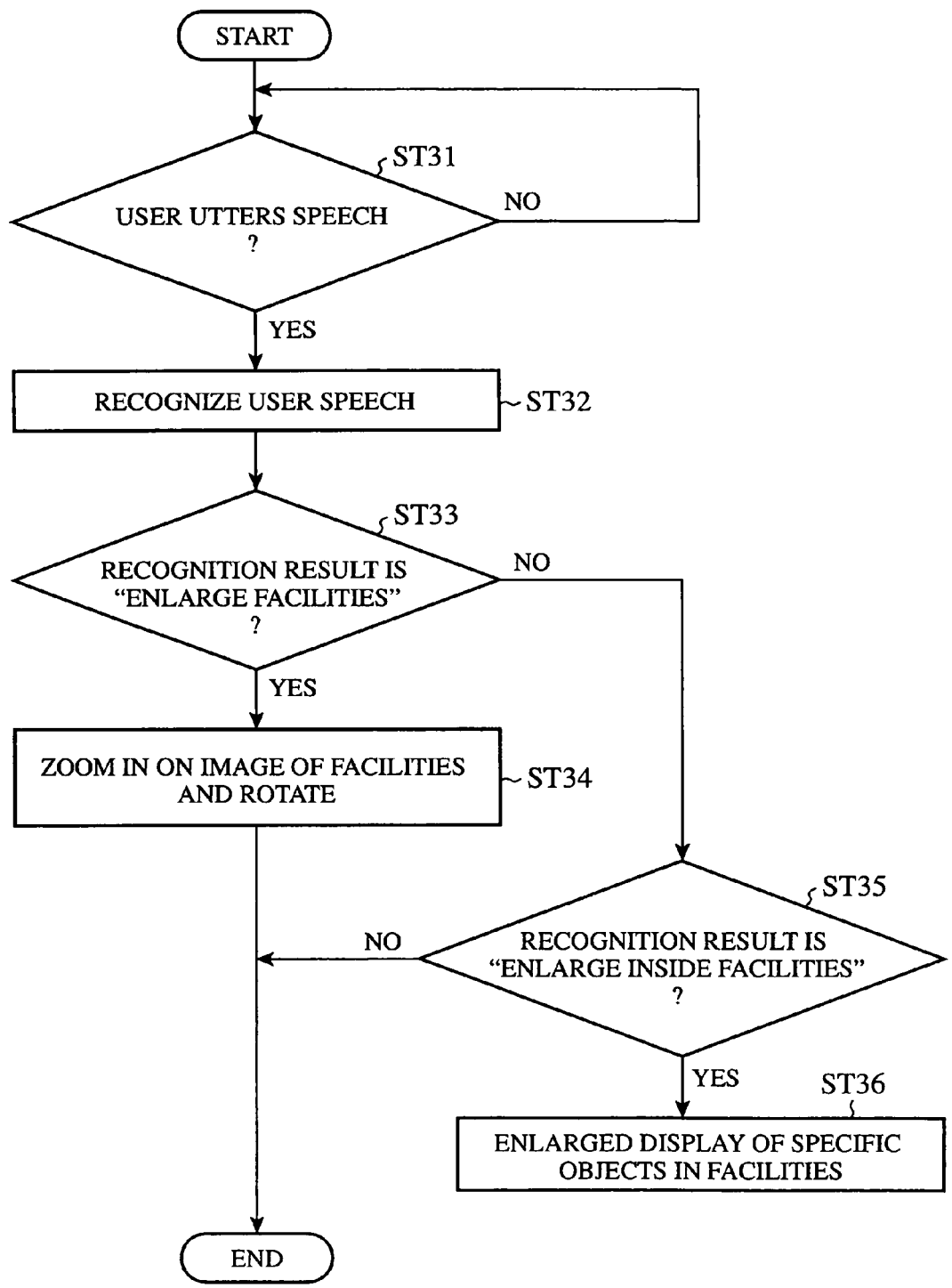
FIG. 10 is a flowchart illustrating processing of the facility display unit of an embodiment 2 in accordance with the present invention.

More specifically, when the user inputs the enlarged display request of the facilities by operating the setting accepting section 1, or when the voice recognizing section 3 recognizes the speech of the user (steps ST31 and ST32 of FIG. 10), and the recognition result of the speech is "enlarge facilities", for example (step ST33), the display control section 7 further zooms in on the image of the facilities which has been zoomed in, and rotates the image of the facilities (step ST34).

On the other hand, when the recognition result of the speech is "enlarge inside facilities" (step ST35), the display control section 7 further zooms in on the image of the facilities which has been zoomed in, and makes enlarged display of the specific objects (such as commodities) inside the facilities (step ST36).

The present embodiment 2 can enlarge the image of the facilities up to the magnitude the user desires. Thus the present embodiment 2 offers an advantage of enabling the user to grasp the facilities and to confirm the specific objects in the facilities more easily than the foregoing embodiment 1.

Embodiment 3

Figure 11:
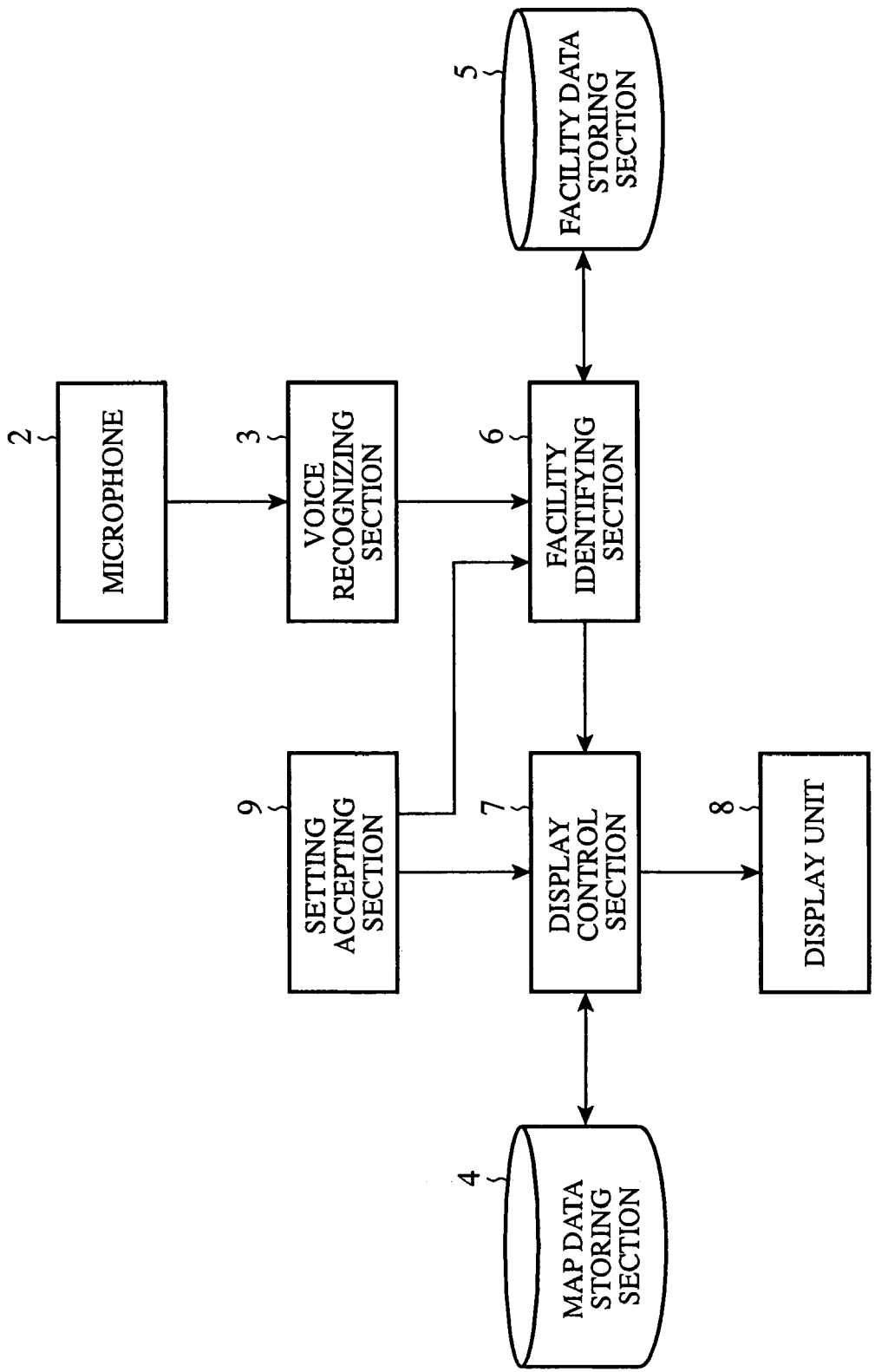
FIG. 11 is a block diagram showing a configuration of the facility display unit of an embodiment 3 in accordance with the present invention.

FIG. 11 is a block diagram showing a configuration of the facility display unit of an embodiment 3 in accordance with the present invention. In FIG. 11, since the same reference numerals designate the same or like portions to those of FIG. 1, their description will be omitted here.

A setting accepting section 9 accepts the setting of the destination and the setting of the display mode of the facilities just as the setting accepting section 1 of FIG. 1. In addition, it also accepts the settings of a zoom-in rate of the image of the facilities and the rotation speed of the image of the facilities.

Although the foregoing embodiment 1 is described by way of example in which the display control section 7 zooms in on the image of the facilities and rotates the image of the facilities, this is not essential. For example, the display control section 7 can zoom in on and rotate the image of the facilities at the zoom-in rate and the rotation speed set by the setting accepting section 9.

More specifically, when the user sets the zoom-in rate of the image of the facilities and the rotation speed of the image of the facilities by operating the setting accepting section 9, the display control section 7 zooms in on the image of the facilities at the zoom-in rate set by the setting accepting section 9, and rotates the image of the facilities at the rotation speed set by the setting accepting section 9.

Thus, the present embodiment 3 offers an advantage of being able to carry out the zoom in of the image of the facilities and the rotation of the image of the facilities at the desired speed of the user.

Embodiment 4

Although the foregoing embodiment 1 is described by way of example in which the display control section 7 zooms in on the image of the facilities and rotates the image of the facilities, this is not essential. For example, such a configuration is also possible which three-dimensionally displays, when receiving a redisplay request of the facilities from the user, the image of the facilities on the wide-area map, again, followed by zooming in on the image of the facilities and the rotation of the image of the facilities.

More specifically, when the display control section 7 receives the redisplay request of the facilities from the user after carrying out the zoom in of the image of the facilities and the rotation of the image of the facilities, the display control section 7 three-dimensionally displays the image of the facilities on the wide-area map, again, in accordance with the image data on the facilities retrieved by the facility identifying section 6 as in the foregoing embodiment 1, followed by the gradual zoom in of the image of the facilities and the rotation of the image of the facilities.

In this case, the redisplay request of the facilities can be input through the operation of the setting accepting section 1 by the user, or through the recognition of the speech of the user (such as "redisplay") by the voice recognizing section 3.

The present embodiment 4 enables the user to watch the image of the facilities again through a replay after completing the zoom in of the image of the facilities and the rotation of the image of the facilities. Thus, the present embodiment 4 offers an advantage of enabling the user to grasp the overall picture of the facilities without fail.

Embodiment 5

Although the foregoing embodiment 1 is described by way of example in which the display control section 7 zooms in on the image of the facilities and rotates the image of the facilities, this is not essential. For example, such a configuration is also possible which displays an image of the destination in the facilities in response to the reception of a detailed display request of the facilities from the user.

For example, consider the case where the destination is a tenant in a high-rise building. In the foregoing embodiment 1, although the image of the high-rise building is displayed when the user utters the name of the high-rise building as the facility name, no image for identifying the tenant in the high-rise building is displayed.

Figure 12:
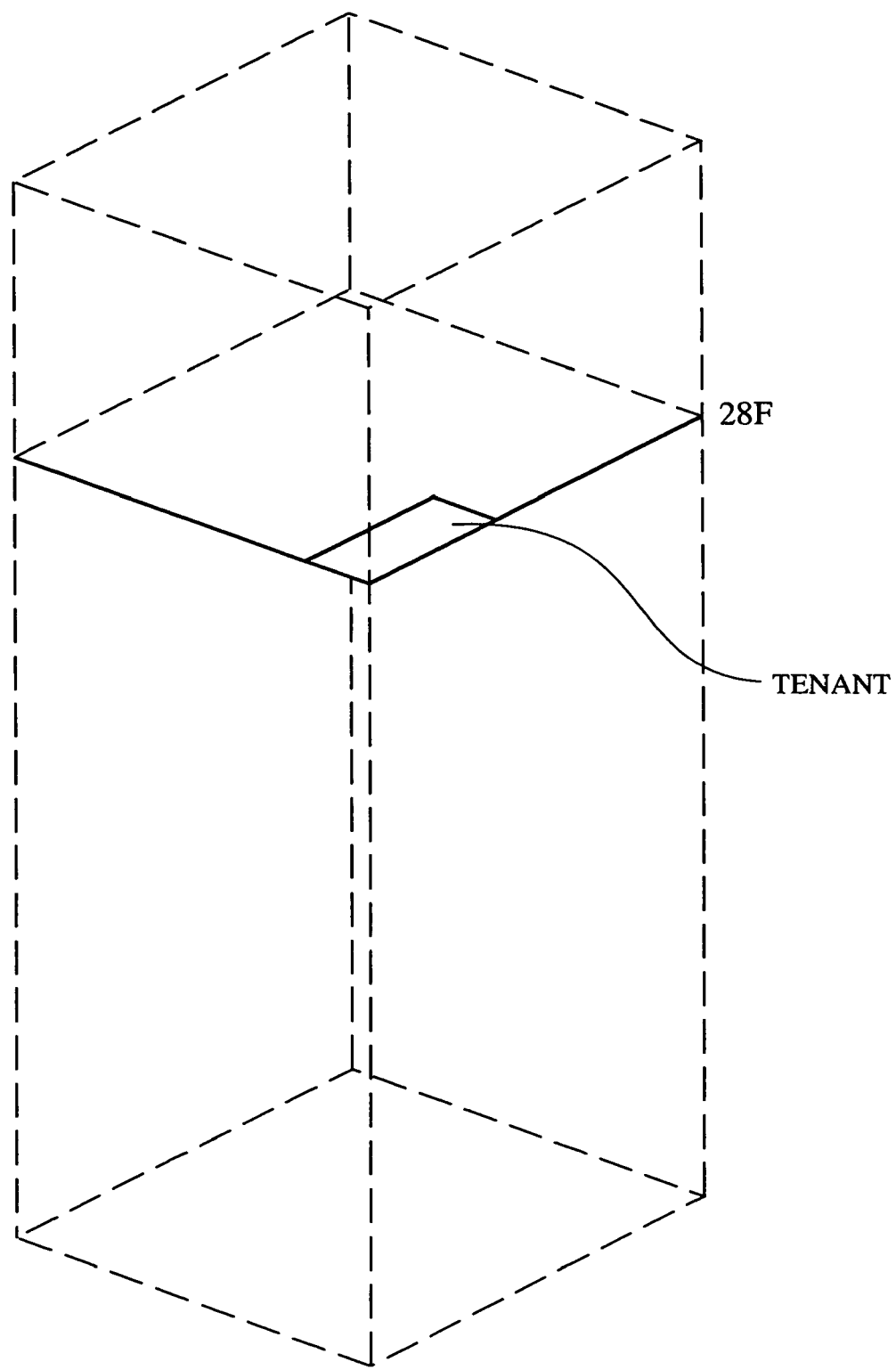
FIG. 12 is a diagram illustrating detailed display contents of facilities.

In the present embodiment 5, receiving a detailed display request of the facilities from the user after displaying the image of the high-rise building, the display control section 7 displays the position of the tenant on the floor by clearly indicating the floor (the number of floors) of the tenant by displaying an overall picture of the high-rise building semi-transparently as shown in FIG. 12.

In this case, the detailed display request of the facilities can be input through the operation of the setting accepting section 1 by the user, or through the recognition of the speech of the user (such as "detailed display") by the voice recognizing section 3.

In addition, after displaying the position of the tenant on the floor, the tenant can be zoomed in to make enlarged display of specific objects (such as commodities) exhibited by the tenant.

The present embodiment 5 is configured in such a manner that the image of the destination in the facilities is displayed in response to the detailed display request of the facilities from the user. Thus, the present embodiment 5 offers an advantage of enabling the user to confirm the position of the destination in the facilities.

Embodiment 6

Figure 13:
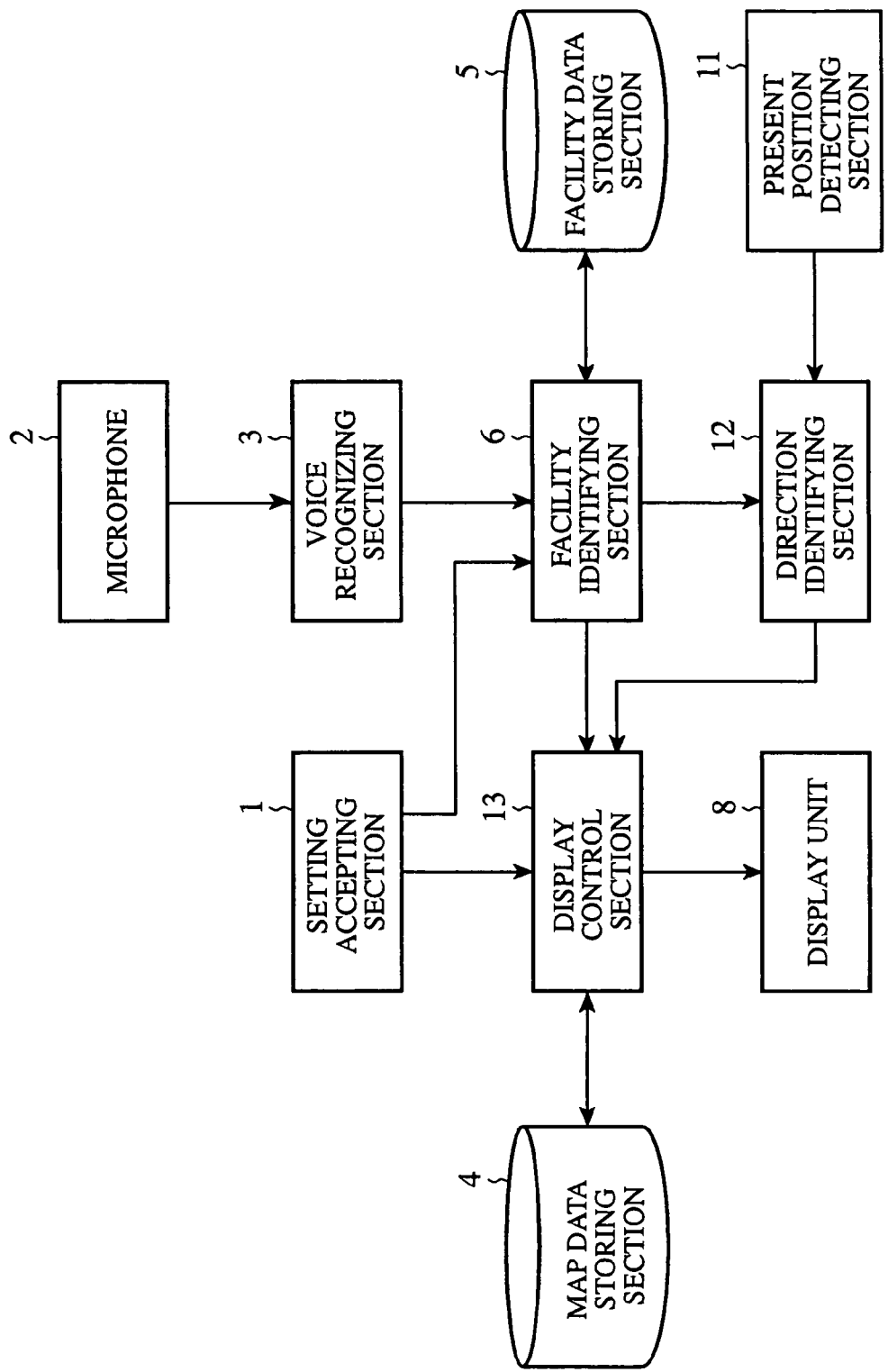
FIG. 13 is a block diagram showing a configuration of the facility display unit of an embodiment 6 in accordance with the present invention.

FIG. 13 is a block diagram showing a configuration of the facility display unit of an embodiment 6 in accordance with the present invention. In FIG. 13, since the same reference numerals designate the same or like portions to those of FIG. 1, their description will be omitted here.

A present position detecting section 11 includes a GPS receiver for receiving GPS signals sent from GPS satellites, for example, and outputs position data by detecting the present position of the vehicle using an existing positioning technique such as DGPS (difference GPS), real time kinematics, VRS, and PAS.

A direction identifying section 12 receives the position data on the present position and the position data on the facilities to be displayed, and identifies the viewing direction of the facilities from the present position.

A display control section 13 has the same processing functions as the display control section 7 of FIG. 1. In addition, the display control section 13 has a function of three-dimensionally displaying the image of the facilities in accordance with the direction identified by the direction identifying section 12. Here, the present position detecting section 11, direction identifying section 12, display control section 13 and display unit 8 constitute a display means.

Next, the operation will be described.

Since the present embodiment 6 is the same as the foregoing embodiment 1 except that the present position detecting section 11 and direction identifying section 12 are added, and the functions of the display control section 13 are added, only different points will be described below.

The present position detecting section 11 receives the GPS signals sent from the GPS satellites, detects the present position of the vehicle from the GPS signals using a known positioning technique, and outputs the position data.

Receiving, the position data on the present position from the present position detecting section 11 and the position data on the facilities to be displayed from the facility identifying section 6, the direction identifying section 12 identifies the viewing direction of the facilities from the present position on the basis of the position data.

Figure 14:
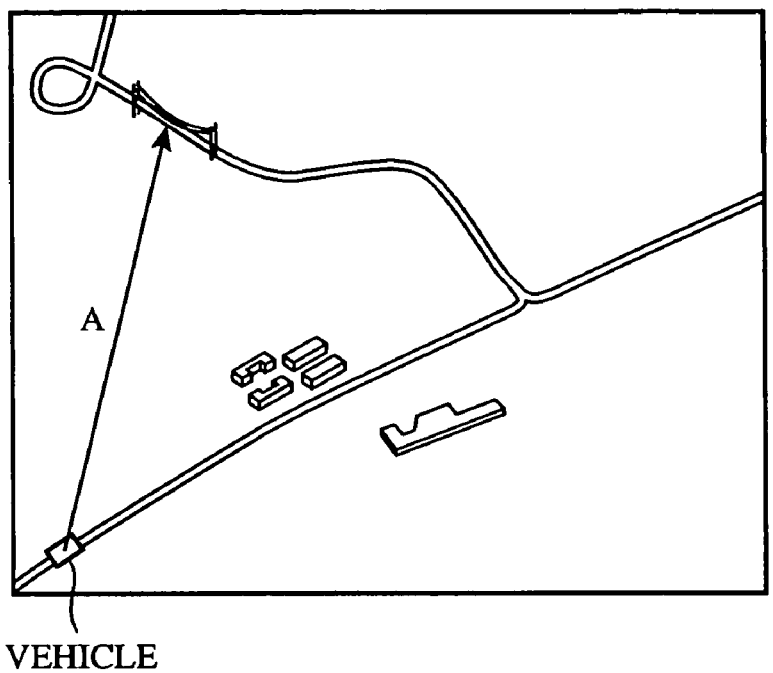
FIG. 14 is a diagram illustrating a viewing direction of the facilities from a present position.
Figure 16:
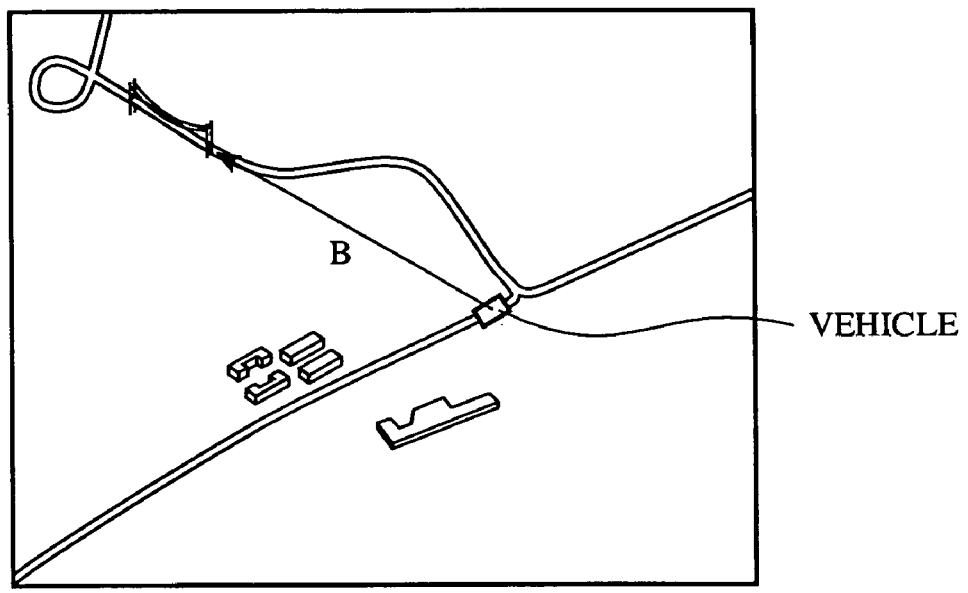
FIG. 16 is a diagram illustrating a viewing direction of the facilities from a present position.

For example, when the vehicle is traveling at the position shown in FIG. 14, the direction identifying section 12 identifies the direction A as the viewing direction of the facilities, and when the vehicle is traveling at the position shown in FIG. 16, the direction identifying section 12 identifies the direction B as the viewing direction of the facilities.

When the facility identifying section 6 retrieves the image data and position data on the facilities to be displayed, the display control section 13 acquires the map data for the three-dimensional display of the region in which the facilities are present from the map data storing section 4 with reference to the position data in the same manner as the foregoing embodiment 1.

Acquiring the map data from the map data storing section 4, the display control section 13 displays the wide-area map on the display unit 8 in accordance with the map data in the same manner as the foregoing embodiment 1, and three-dimensionally displays the image of the facilities on the wide-area map according to the image data on the facilities retrieved by the facility identifying section 6.

When displaying the wide-area map including the image of the facilities, the display control section 13, using the computer graphics technique, three-dimensionally displays the image of the facilities in accordance with the direction identified by the direction identifying section 12.

Figure 15:
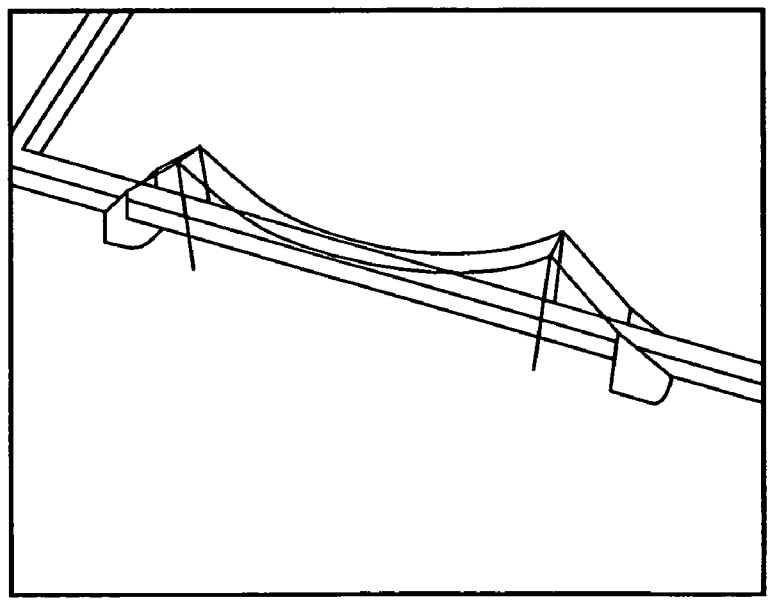
FIG. 15 is a diagram illustrating an image of the facilities seen from a direction A.

More specifically, when the viewing direction of the facilities is the direction A (see FIG. 14), the display control section 13 three-dimensionally displays the image of the facilities seen from the direction A on the wide-area map, and zooms in on the image of the facilities (see FIG. 15).

Figure 17:
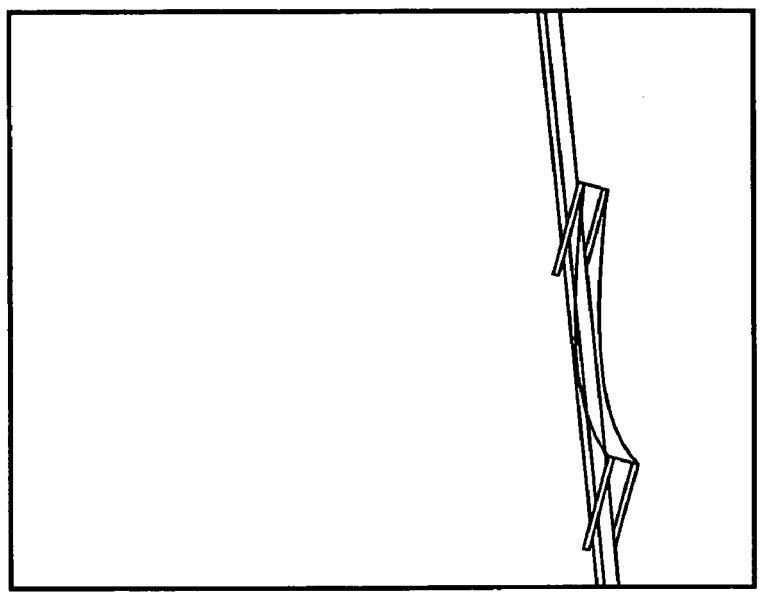
FIG. 17 is a diagram illustrating an image of the facilities seen from a direction B.

On the other hand, when the viewing direction of the facilities is the direction B (see FIG. 16), the display control section 13 three-dimensionally displays the image of the facilities seen from the direction B on the wide-area map, and zooms in on the image of the facilities (see FIG. 17).

After completing the zoom in of the image of the facilities, the display control section 13 displays the image of the facilities in all the directions with rotating the image of the facilities in the same manner as the foregoing embodiment 1 to enable the user to grasp the whole body of the facilities.

Although the present embodiment 6 is described by way of example in which the image of the facilities is rotated after completing the zoom in of the image of the facilities, the image of the facilities can be rotated during the zoom in of the image of the facilities.

As is clear from the foregoing description, the present embodiment 6 is configured in such a manner that it identifies the viewing direction of the facilities identified by the facility identifying section 6 from the present position, and three-dimensionally displays the image of the facilities in accordance with the direction. Thus, when the facilities are actually visible from present position, the present embodiment 6 makes it easier to compare the actually visible facilities with the image of the facilities displayed on the display unit 8, thereby offering an advantage of enabling the user to confirm the actual facilities more easily.

Embodiment 7

The foregoing embodiment 1 is described by way of example in which the display control section 7 three-dimensionally displays the image of the facilities on the map. However, when there are large buildings or mountains (called surrounding facilities from now on) near the facilities, the facilities to be displayed cannot be displayed clearly because they are obstructed by the surrounding facilities.

In view of this, in the present embodiment 7, when there are surrounding facilities that will obstruct the facilities identified by the facility identifying section 6, the display control section 7 deemphasizes the tone of displaying the surrounding facilities of the facilities to clearly display the facilities identified by the facility identifying section 6.

Figure 18A:
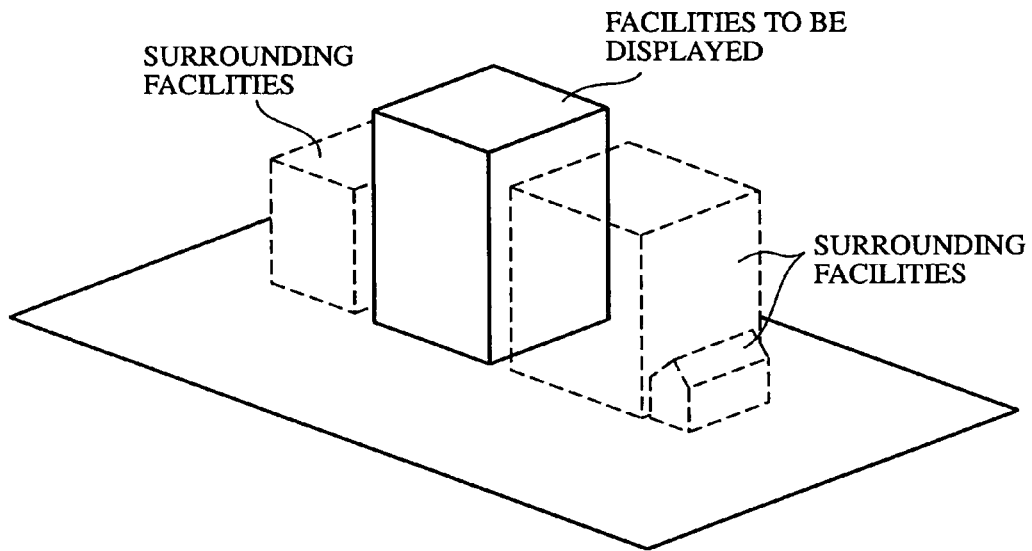
FIG. 18 is a diagram illustrating display contents of the facilities to be displayed when surrounding facilities are present which obstruct the facilities to be displayed.
Figure 18B:
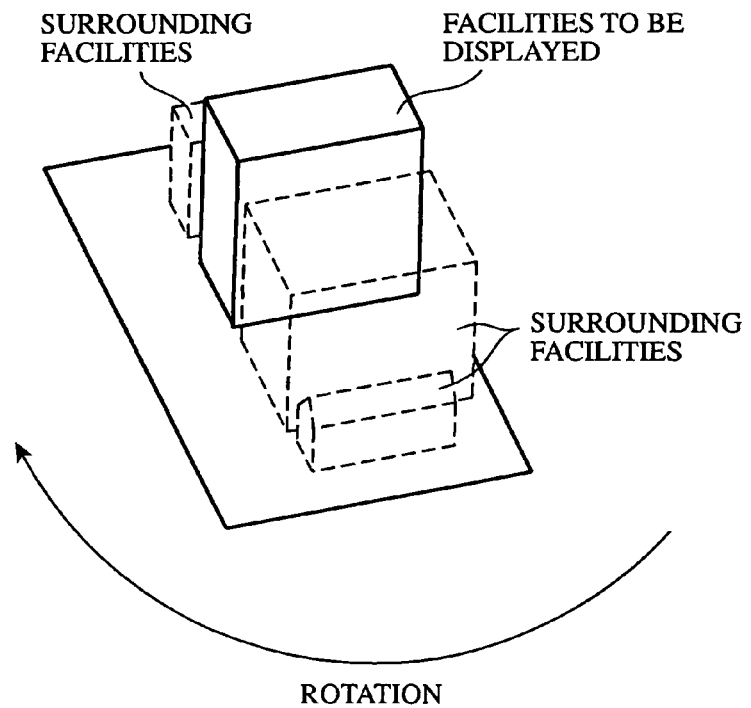

More specifically, the display control section 7 displays the image of the surrounding facilities semitransparently as shown in FIG. 18A, thereby emphasizing the display of the facilities to be displayed which are identified by the facility identifying section 6. FIG. 18B shows a state in which the facilities of FIG. 18A are rotated.

Alternatively, the display control section 7 displays the image of the surrounding facilities in monochrome, and the facilities to be displayed which are identified by the facility identifying section 6 in color.

Alternatively, the facilities to be displayed which are identified by the facility identifying section 6 are enlarged to be displayed, and the image of the surrounding facilities is reduced or kept without changing the size to be displayed.

Alternatively, the facilities to be displayed which are identified by the facility identifying section 6 are blinkingly displayed.

As is clear from the foregoing description, the present embodiment 7 offers an advantage of being able to display the facilities to be displayed clearly even when there are surrounding facilities obstructing the facilities to be displayed.

Embodiment 8

Although the foregoing embodiment 1 is described by way of example in which the display control section 7 three-dimensionally displays the image of the facilities on the map, this is not essential. The display control section 7 can change the color of display of the facilities identified by the facility identifying section 6 in accordance with the present time zone or weather.

For example, when the present time zone is the daytime, the display control section 7 displays the image of the facilities in the sunlight. In contrast, when the present time zone is night, the display control section 7 displays the image of the facilities lighted up.

When it is fine, the display control section 7 increases the brightness of the image of the facilities. In contrast, when it is cloudy or raining, the display control section 7 reduces the brightness of the image of the facilities. Here, information about the weather can be acquired from the Internet, for example, or by detecting the movement of a wiper of the vehicle traveling near the facilities to be displayed.

Thus, the present embodiment 8 offers an advantage of being able to make the image of the facilities more similar to the present conditions.

In addition, the display control section 7 can change the color of display of the surroundings of the facilities identified by the facility identifying section 6 in accordance with the present season.

For example, when roadside trees are planted around the facilities to be displayed, the display control section 7 displays the roadside trees in bright green when the present season is spring, or in red when the present season is autumn.

Thus, the present embodiment 8 offers an advantage of being able to make the image around the facilities more similar to the present conditions.

Embodiment 9

Although the foregoing embodiment 1 is described by way of example in which the display control section 7 three-dimensionally displays the image of the facilities on the map, this is not essential. For example, consider the case where the facility data storing section 5 stores guidance on various facilities (such as features of the facilities and information about exhibition and commodities). In this case, when the display control section 7 three-dimensionally displays the image of the facilities identified by the facility identifying section 6 on the map, it can display the guidance on the display unit 8 by acquiring the guidance on the facilities from the facility data storing section 5.

Figure 19:
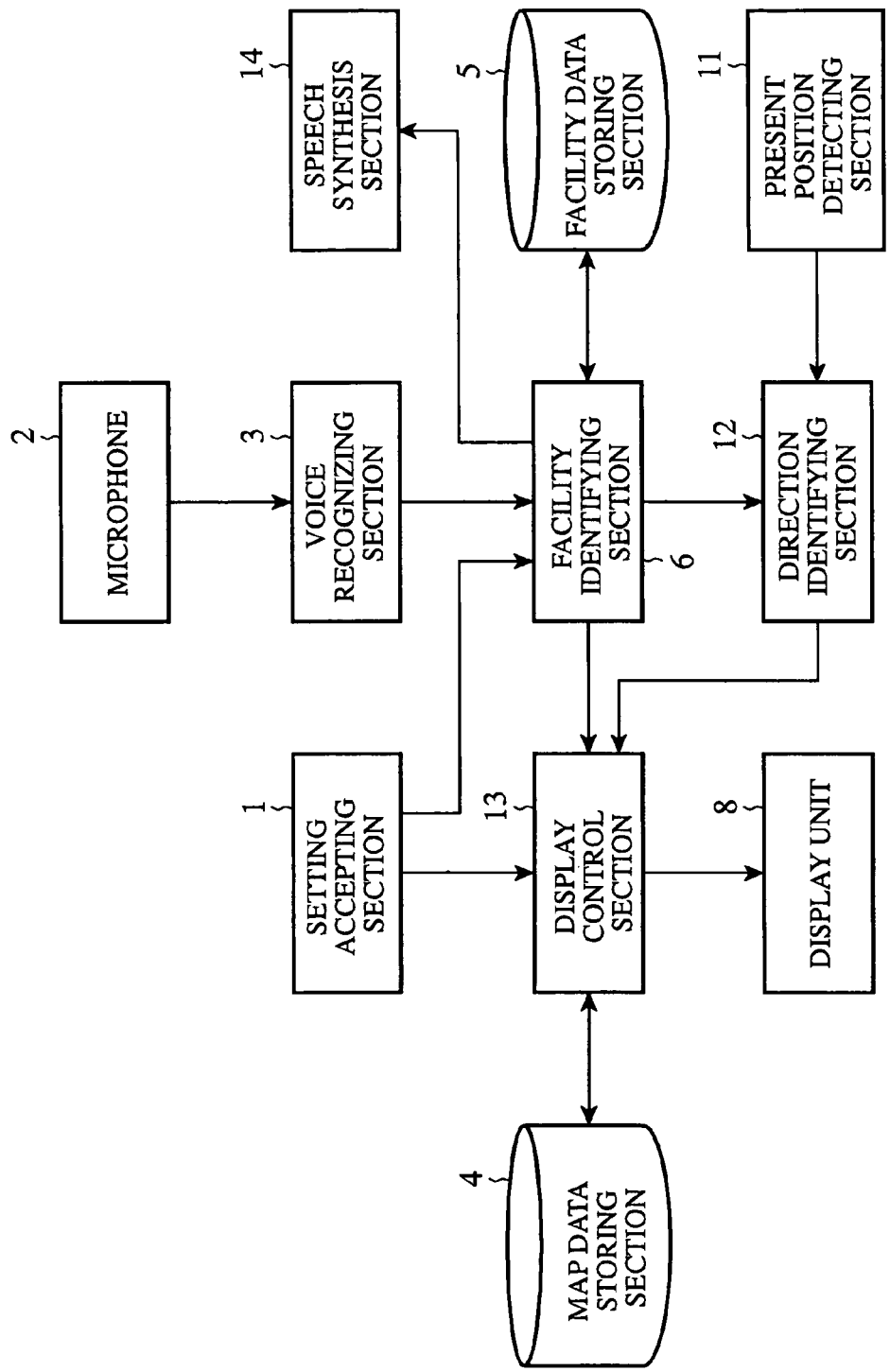
FIG. 19 is a block diagram showing a configuration of the facility display unit of an embodiment 9 in accordance with the present invention.

In addition, such a configuration as shown in FIG. 19 is also possible which includes a speech synthesis section 14 as a speech output means, and causes the speech synthesis section 14 to output in speech the guidance on the facilities identified by the facility identifying section 6.

The present embodiment 9 offers an advantage of being able to provide the user with useful information.

Embodiment 10

Figure 20:
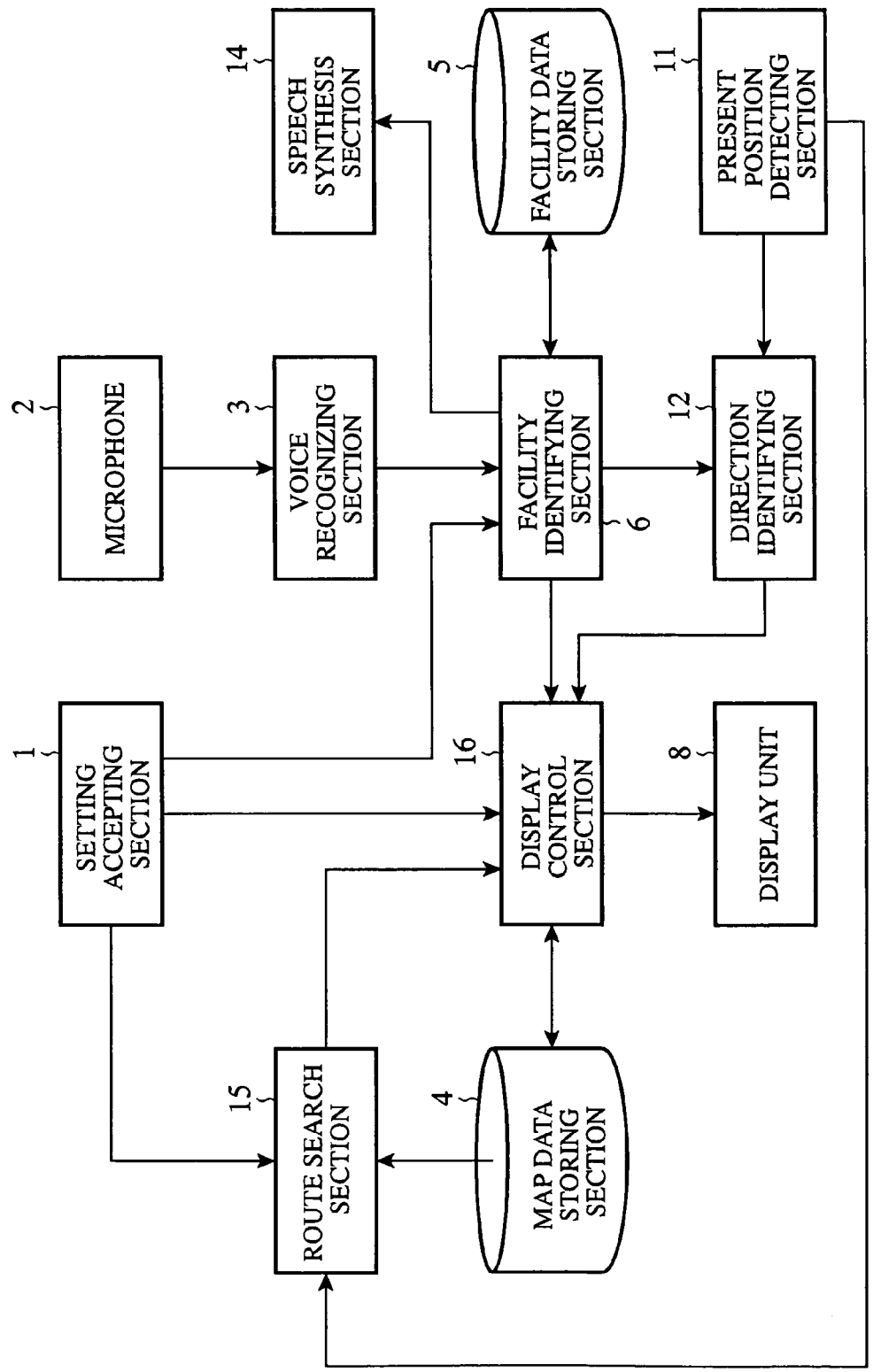
FIG. 20 is a block diagram showing a configuration of the facility display unit of an embodiment 10 in accordance with the present invention.

FIG. 20 is a block diagram showing a configuration of the facility display unit of an embodiment 10 in accordance with the present invention. In FIG. 20, since the same reference numerals designate the same or like portions to those of FIG. 19, their description will be omitted here.

A route search section 15 searches for a route from the present position to the destination, and a parking lot of the destination.

A display control section 16 has the same processing functions as the display control section 13 of FIG. 19. In addition, it has a function of displaying on the display unit 8 the route from the present position to the destination and the parking lot of the destination, which are searched for by the route search section 15.

The present position detecting section 11, direction identifying section 12, route search section 15, display control section 16 and display unit 8 constitute a display means.

Next, the operation will be described.

Since the present embodiment 10 is the same as the foregoing embodiment 9 except that the route search section 15 is added, and the functions of the display control section 16 are added, only different points will be described below.

The route search section 15 has the route search functions of a common navigation unit. When the user sets the destination by operating the setting accepting section 1 or the voice recognizing section 3 sets the destination by recognizing the speech of the user, and when the present position detecting section 11 outputs the position data by detecting the present position of the vehicle, the route search section 15 searches for the route from the present position to the destination and the parking lot of the destination with reference to the map data stored in the map data storing section 4.

When the route search section 15 searches for the route from the present position to the destination and the parking lot of the destination, the display control section 16 displays on the display unit 8 the route from the present position to the destination and the parking lot of the destination.

As is clear from the foregoing description, the present embodiment 10 is configured in such a manner that it displays not only the image of the facilities identified by the facility identifying section 6, but also the route from the present position to the destination and the parking lot of the destination. Thus, the present embodiment offers an advantage of enabling the user to reach the destination more easily.

INDUSTRIAL APPLICABILITY

As described above, the facility display unit in accordance with the present invention is suitable for being mounted on a navigation unit such as a car navigation system having a function of displaying the image of the facilities when the facilities of the destination are set, for example.

What is claimed is:

1. A facility display apparatus comprising:
   a setting unit for setting a display mode of facilities selected by a user from a plurality of selectable display modes, the selectable display modes including a mode for displaying facilities as a moving picture and a mode for displaying facilities as a still picture;
   a facility identifying unit for identifying facilities at a point of interest selected by the user from a plurality of selectable points of interest, the facilities being identified to be displayed; and
   a display unit for displaying on a map at least one of a moving picture and a still picture of the facilities identified by said facility identifying unit in accordance with the display mode set by said setting unit,
   wherein:
   the map illustrates a route from a present geographical location of the user to the point of interest,
   when the user selects the mode for displaying facilities as a moving picture, said display unit displays the moving picture of the identified facilities on the map, the moving picture automatically rotating a three-dimensional image of the identified facilities by a preset amount to provide multiple views of the identified facilities from multiple directions, the three-dimensional image being automatically rotated the same amount regardless of which facilities are identified by the facility identifying means and regardless of the user's geographical location while the moving picture is displayed, and
   the identified facilities comprises at least one physical object having a fixed geographical location at the selected point of interest.

2. The facility display apparatus according to claim 1, wherein said facility identifying unit identifies the facilities to be displayed by recognizing speech of a user.

3. The facility display apparatus according to claim 1, wherein said facility identifying unit identifies the facilities to be displayed according to operation of input keys by a user.

4. The facility display apparatus according to claim 1, wherein
said display unit three-dimensionally displays an image of the facilities identified by said facility identifying unit on a wide-area map, and zooms in on the image of the facilities, and
the current position of the user is different than the location of the identified facilities with respect to the wide-area map.

5. The facility display apparatus according to claim 4, wherein said display unit rotates the image of the identified facilities simultaneously with the zoom in, or after completing the zoom in, when the mode for displaying facilities as a moving picture is selected by the user.

6. The facility display apparatus according to claim 5, wherein said display unit zooms in on or rotates the image of the identified facilities at a zoom-in rate or rotation speed set by said setting unit.

7. The facility display apparatus according to claim 5, wherein when receiving a redisplay request of the identified facilities from a user, said display unit three-dimensionally displays the image of the identified facilities on a wide-area map again, and zooms in on the image of the identified facilities and rotates the image of the identified facilities.

8. The facility display apparatus according to claim 4, wherein said display unit zooms in on the image of the identified facilities while maintaining a whole body of the facilities within a display area on a display.

9. The facility display apparatus according to claim 4, wherein when receiving an enlarged display request of the identified facilities from the user, said display unit further zooms in on the image of the facilities which has been zoomed in.

10. The facility display apparatus according to claim 1, wherein when receiving a detailed display request of the identified facilities from a user, said display unit displays an image of a destination in the identified facilities.

11. The facility display apparatus according to claim 1, wherein said display unit identifies a direction of the facilities identified by said facility identifying unit when viewed from a present position, and three-dimensionally displays the image of the identified facilities in accordance with the direction.

12. The facility display apparatus according to claim 1, wherein said display unit deemphasizes a display tone of surroundings of the facilities identified by said identifying unit as compared with a display tone of the facilities identified by said facility identifying unit.

13. The facility display apparatus according to claim 12, wherein said display unit displays semitransparently or in monochrome an image of facilities surrounding the facilities identified by said facility identifying unit.

14. The facility display apparatus according to claim 1, wherein said display unit displays an enlarged image of the facilities identified by said facility identifying unit, and displays an image of facilities surrounding the facilities at a reduced or original ratio.

15. The facility display apparatus according to claim 1, wherein said display unit blinkingly displays the image of the facilities identified by said facility identifying unit.

16. The facility display apparatus according to claim 1, wherein said display unit changes a color of display of the facilities identified by said facility identifying unit in accordance with a present time zone or weather, and changes a color of display of surroundings of the facilities in accordance with a present season.

17. The facility display apparatus according to claim 1, wherein said display unit displays guidance on the facilities identified by said facility identifying unit.

18. The facility display apparatus according to claim 1, further comprising speech output unit for outputting speech guidance on the facilities identified by said facility identifying unit.

19. The facility display apparatus according to claim 1, wherein said display unit displays a route from the present position to the destination or a parking lot of the destination besides the image of the facilities identified by said facility identifying unit.

20. The facility display apparatus according to claim 1, further comprising:
a facility data storing unit for storing image data and position data of the facilities,
a map data storing unit for storing map data,
wherein
the facility identifying unit retrieves the image data and position data of the identified facilities from the facility data storing unit,
the display unit displays the map according to map data retrieved from the map data storing unit, and displays the image data retrieved by the facility identifying unit on the displayed map.

21. A computer-implemented method for displaying facilities in a facility display apparatus, the method comprising:
receiving via an input device a user selection of a display mode of facilities from a plurality of selectable display modes, the selectable display modes including a mode for displaying facilities as a moving picture and a mode for displaying facilities as a still picture;
receiving via an input device a user selection of a point of interest from a plurality of selectable points of interest,
identifying facilities at the selected point of interest selected, and retrieving image data from a storage device of the identified facilities;
displaying a map on a display device; and
displaying on the map at least one of a moving picture and a still picture of the identified facilities in accordance with the set display mode,
wherein:
the map illustrates a route from a present geographical location of the user to the selected point of interest;
when the user selects the mode for displaying facilities as a moving picture, said display means displays the moving picture of the identified facilities on the map, the moving picture automatically rotating a three-dimensional image of the identified facilities by a preset amount to provide multiple views of the identified facilities from multiple directions, the three-dimensional image being automatically rotated the same amount regardless of which facilities are identified and regardless of the user's geographical location while the moving picture is displayed, and the identified facilities comprises at least one physical object having a fixed geographical location at the selected point of interest.

22. The method according to claim 21, wherein said identifying step identifies the facilities to be displayed by recognizing speech of the user.

23. The method according to claim 21, wherein said facility identifying step identifies the facilities to be displayed according to operation of input keys by the user.

24. The method according to claim 21, further comprising:
three-dimensionally displaying an image of the facilities identified by said identifying step on a wide-area map, and zooming in on the displayed image of the facilities,
wherein the current position of the user is different than the location of the identified facilities with respect to the wide-area map.

25. The method according to claim 24, wherein the displayed image of the identified facilities simultaneously with the zoom in, or after the zoom in is completed, when the mode for displaying facilities as a moving picture is selected by the user.

26. The method according to claim 25, wherein said zoom in or rotation of the image of the identified facilities at a zoom-in rate or rotation speed selected by the user.

27. The method according to claim 25, further comprising:
when receiving a redisplay request of the identified facilities from the user, repeating the steps of three-dimensionally displaying the image of the identified facilities on a wide-area map, zooming in on the image of the identified facilities, and rotating the image of the identified facilities.

28. The method according to claim 24, wherein a whole body of the facilities is maintained within a display area on the display device while the displayed image of the identified facilities is zoomed in.

29. The method according to claim 24, further comprising:
when receiving an enlarged display request of the identified facilities from the user, further zooming in on the image of the facilities which has been zoomed in.

30. The method according to claim 21, further comprising:
when receiving a detailed display request of the identified facilities from the user, displaying an image of a destination in the identified facilities.

31. The method according to claim 21, further comprising:
identifying a direction of the identified facilities when viewed from a present position, and three-dimensionally displaying the image of the identified facilities in accordance with the direction.

32. The method according to claim 21, further comprising:
deemphasizing a display tone of surroundings of the identified facilities as compared with a display tone of the identified facilities.

33. The method according to claim 32, further comprising:
displaying semitransparently or in monochrome an image of facilities surrounding the identified facilities.

34. The method according to claim 21, further comprising:
displaying an enlarged image of the identified, and displaying an image of facilities surrounding the facilities at a reduced or original ratio.

35. The method according to claim 21, further comprising:
blinkingly displaying an image of the facilities identified by said facility identifying unit.

36. The method according to claim 21, further comprising:
changing a color of display of the identified facilities in accordance with a present time zone or weather, and changing a color of display of surroundings of the facilities in accordance with a present season.

37. The method according to claim 21, further comprising:
displaying guidance on the identified facilities.

38. The method according to claim 21, further comprising:
outputting speech guidance on the identified facilities.

39. The method according to claim 21, further comprising:
displaying a route from the present position to the destination or a parking lot of the destination besides an image of the identified facilities.

40. The method according to claim 21, further comprising:
storing image data and position data of the facilities in a facility data storing unit;
storing map data in a map data storing unit;
retrieving image data and position data of the identified facilities from the facility data storing unit; and
displaying the map according to map data retrieved from the map data storing unit, and displaying the image data retrieved by the facility identifying unit on the displayed map.

* * * * *